US008827185B2

(12) United States Patent
Simmons et al.

(10) Patent No.: US 8,827,185 B2
(45) Date of Patent: Sep. 9, 2014

(54) MEASURING DISPENSER FOR GRANULAR SEASONING MATERIAL AND METHOD OF SEASONING

(75) Inventors: Paul G. Simmons, Glen Ellyn, IL (US); Scott G. Peterson, Cary, IL (US); Michael S. Tucker, Valatie, NY (US); James E. Johanson, Old Chatham, NY (US); Russell V. Plum, Jr., St. Charles, IL (US); William C. Mulkey, St. Charles, IL (US)

(73) Assignee: Restaurant Technology, Inc., Oak Brook, IL (US)

( * ) Notice: Subject to any disclaimer, the term of this patent is extended or adjusted under 35 U.S.C. 154(b) by 237 days.

(21) Appl. No.: 13/317,344

(22) Filed: Oct. 14, 2011

(65) Prior Publication Data

US 2013/0092705 A1   Apr. 18, 2013

(51) Int. Cl.
| B67D 7/76 | (2010.01) |
| B67D 7/06 | (2010.01) |
| A01G 25/14 | (2006.01) |
| A01C 3/06 | (2006.01) |
| A01C 7/08 | (2006.01) |
| A01C 15/00 | (2006.01) |
| E01C 19/20 | (2006.01) |
| A47J 47/04 | (2006.01) |

(52) U.S. Cl.
CPC ..................... *A47J 47/04* (2013.01)
USPC ...... 239/378; 239/650; 222/189.02; 222/191; 222/472

(58) Field of Classification Search
USPC .......... 239/378, 375, 650; 222/168.5, 189.02, 222/191, 330, 375, 417, 429, 472
See application file for complete search history.

(56) References Cited

U.S. PATENT DOCUMENTS

| 152,909 A | 7/1874 | McSkimin |
| 509,320 A | 11/1893 | Long, Jr. |
| 576,241 A | 2/1897 | Van Ame |
| 845,347 A | 2/1907 | Gesell |
| 897,453 A | 9/1908 | Byam |
| 903,548 A | 11/1908 | De Hayes |

(Continued)

FOREIGN PATENT DOCUMENTS

| EP | 0335505 | 10/1989 |
| GB | 2119285 | 11/1983 |

(Continued)

OTHER PUBLICATIONS

International Searching Authority (ISA/US), International Search Report and Written Opinion, International Application No. PCT/US2012/059923, Date of Mailing Jan. 11, 2013.

(Continued)

*Primary Examiner* — Justin Jonaitis
(74) *Attorney, Agent, or Firm* — Hinshaw & Culbertson LLP

(57) ABSTRACT

A dispenser for granular materials and a method of seasoning using the dispenser is provided. The dispenser has multiple deflectors. The deflectors can deflect granular materials in tangential and radial directions. The dispenser has a dispensing mechanism actuated by a user-manipulable lever connected to a yoke in which a pin is received for rotating a member of the dispenser. The dispenser achieves consistent quantities with each dispense with three different features. One feature is having a rim partially raised around the first member aperture. Another feature is pushing elements that cooperate with the partially raised rim. A third feature is radially staggered dispensing apertures.

30 Claims, 7 Drawing Sheets

(56) References Cited

U.S. PATENT DOCUMENTS

| | | |
|---|---|---|
| 913,027 A | 2/1909 | Meaker |
| 928,052 A | 7/1909 | Hirsch |
| 934,493 A | 9/1909 | Wolkenstein |
| 1,005,130 A | 10/1911 | Andrews |
| 1,084,530 A | 1/1914 | Bettman |
| 1,123,974 A | 1/1915 | Antoine |
| 1,270,262 A | 6/1918 | Buckland |
| 1,361,146 A | 12/1920 | Egnatoff |
| 1,400,757 A | 12/1921 | Malusz |
| 1,600,815 A | 9/1926 | Gallo et al. |
| 1,607,530 A | 11/1926 | Guest |
| 1,618,688 A | 2/1927 | Tempest |
| 1,682,804 A | 9/1928 | Searight |
| 1,700,350 A | 1/1929 | Daniek |
| 1,707,967 A | 4/1929 | Abbott |
| 1,727,799 A | 9/1929 | Abbott |
| 1,763,449 A | 6/1930 | Trautvetter |
| 1,877,808 A | 9/1932 | Cagliostro |
| 1,891,787 A | 12/1932 | Swartz |
| 1,938,100 A | 12/1933 | Gessler |
| 1,941,745 A | 1/1934 | Higley |
| 1,982,094 A | 11/1934 | Gessler |
| 2,021,004 A | 11/1935 | Garrido |
| 2,022,031 A | 11/1935 | Fisher |
| 2,065,061 A | 12/1936 | Doering |
| 2,136,805 A | 11/1938 | Scharinger |
| 2,269,876 A | 1/1942 | Jensen |
| 2,358,723 A | 9/1944 | McFarlane |
| 2,393,454 A | 1/1946 | Bailey |
| 2,416,810 A * | 3/1947 | Bailey ............................ 209/357 |
| 2,423,784 A | 7/1947 | Mackey |
| 2,473,585 A | 6/1949 | Harwood |
| 2,515,735 A | 7/1950 | Saunders |
| 2,521,662 A | 9/1950 | Wyman et al. |
| 2,604,235 A | 7/1952 | Teston |
| 2,644,616 A | 7/1953 | Gordon |
| 2,647,681 A | 8/1953 | Paoli |
| 2,693,301 A | 11/1954 | Allen, Jr. |
| 2,704,623 A | 3/1955 | Yasso |
| 2,752,076 A | 6/1956 | Locker |
| 2,815,153 A | 12/1957 | McCarthy |
| 2,877,937 A | 3/1959 | Weir |
| 2,980,297 A | 4/1961 | Tucci |
| 3,042,532 A | 7/1962 | Daline |
| 3,126,125 A | 3/1964 | Eggers |
| 3,152,010 A | 10/1964 | Case |
| 3,172,580 A | 3/1965 | Mackey |
| 3,229,856 A | 1/1966 | Jungmann |
| 3,258,177 A | 6/1966 | Ellis |
| 3,323,683 A | 6/1967 | Cianciolo |
| 3,344,731 A | 10/1967 | Trees |
| 3,344,962 A | 10/1967 | Popivalo |
| 3,353,725 A | 11/1967 | Caceres |
| 3,398,857 A | 8/1968 | Alio |
| 3,476,297 A | 11/1969 | Swett et al. |
| 3,486,665 A | 12/1969 | La Croce |
| 3,512,681 A | 5/1970 | Frankel |
| 3,584,771 A | 6/1971 | Wakamatsu |
| 3,731,851 A | 5/1973 | Rauh |
| 3,737,075 A | 6/1973 | Atchley |
| 3,760,983 A | 9/1973 | Thompson |
| 3,840,159 A | 10/1974 | Downey |
| 3,945,511 A | 3/1976 | Delorme |
| 3,970,123 A | 7/1976 | Poulton et al. |
| 3,971,493 A | 7/1976 | Williams |
| 4,003,555 A | 1/1977 | Swartz |
| 4,159,791 A | 7/1979 | Crutcher |
| 4,201,320 A | 5/1980 | Eppenbach |
| 4,353,487 A | 10/1982 | Ferrante |
| 4,369,901 A | 1/1983 | Hidding |
| 4,424,921 A | 1/1984 | Feuerstein et al. |
| 4,522,315 A | 6/1985 | Rapp |
| 4,529,337 A | 7/1985 | Hilgraf et al. |
| 4,728,011 A | 3/1988 | Schuster et al. |
| 4,756,433 A | 7/1988 | Lin |
| 4,757,916 A | 7/1988 | Goncalves |
| 4,779,771 A | 10/1988 | Song |
| 4,785,976 A * | 11/1988 | Bennie et al. .................. 222/370 |
| 4,790,453 A | 12/1988 | Fontana et al. |
| 4,828,130 A | 5/1989 | Hofmann |
| 4,828,149 A | 5/1989 | Hester |
| 4,856,681 A | 8/1989 | Murray |
| 4,934,570 A | 6/1990 | Bamberger et al. |
| 4,949,869 A | 8/1990 | Ribouleau |
| 4,951,839 A | 8/1990 | Kong |
| 4,961,521 A | 10/1990 | Eckman |
| 4,966,780 A | 10/1990 | Hargraves et al. |
| 5,024,616 A | 6/1991 | Ogle, II |
| 5,083,679 A | 1/1992 | Plough |
| 5,169,049 A | 12/1992 | Krupic et al. |
| D336,728 S | 6/1993 | Ancona et al. |
| 5,245,949 A | 9/1993 | Hively |
| 5,346,105 A | 9/1994 | Onneweer |
| 5,429,281 A | 7/1995 | Sellers |
| 5,454,487 A | 10/1995 | Vassiliou |
| 5,467,903 A | 11/1995 | Sorensen et al. |
| 5,490,615 A | 2/1996 | Robbins et al. |
| 5,495,962 A | 3/1996 | Nomura |
| 5,526,966 A | 6/1996 | Lutzker |
| 5,601,213 A | 2/1997 | Daniello |
| 5,683,361 A | 11/1997 | Elk et al. |
| 5,711,463 A | 1/1998 | Chen et al. |
| 5,746,355 A | 5/1998 | Wold |
| 5,772,044 A | 6/1998 | Euzen et al. |
| 5,839,619 A | 11/1998 | Willer |
| 5,850,923 A * | 12/1998 | DeCoster et al. ............. 209/417 |
| 5,850,944 A | 12/1998 | Robbins, III et al. |
| 5,894,965 A | 4/1999 | Robbins, III et al. |
| 5,934,573 A * | 8/1999 | Weterrings et al. ........... 239/650 |
| 5,960,987 A | 10/1999 | Solland et al. |
| 5,960,999 A | 10/1999 | Wallays |
| 5,967,374 A | 10/1999 | Baker |
| 6,076,708 A | 6/2000 | Ceccarelli et al. |
| 6,183,154 B1 | 2/2001 | Coe |
| 6,223,651 B1 | 5/2001 | Campbell |
| 6,267,269 B1 | 7/2001 | Kates |
| 6,269,983 B1 | 8/2001 | Jones et al. |
| 6,315,174 B1 | 11/2001 | Bowker |
| 6,332,704 B1 | 12/2001 | Gasser et al. |
| 6,352,180 B1 | 3/2002 | Reyhons |
| 6,382,461 B1 | 5/2002 | Olsson |
| 6,422,426 B1 | 7/2002 | Robbins, III et al. |
| 6,422,432 B1 | 7/2002 | Alldredge |
| 6,467,656 B1 | 10/2002 | Nagayanagi |
| 6,494,350 B2 | 12/2002 | Kelley |
| 6,499,679 B1 * | 12/2002 | Woodruff et al. ............. 239/687 |
| 6,516,973 B2 | 2/2003 | Chrisman et al. |
| 6,550,640 B2 | 4/2003 | Smith |
| 6,948,641 B1 | 9/2005 | Williams |
| 7,143,909 B2 | 12/2006 | Peterson et al. |
| 7,819,347 B2 | 10/2010 | Antal, Sr. |
| 2001/0007327 A1 | 7/2001 | Ritsche et al. |
| 2002/0066747 A1 | 6/2002 | Argentieri et al. |
| 2003/0205590 A1 | 11/2003 | Alldredge et al. |
| 2003/0213820 A1 | 11/2003 | Sherk, Jr. et al. |
| 2004/0113000 A1 | 6/2004 | Ng |
| 2005/0258189 A1 | 11/2005 | Peterson et al. |
| 2005/0279766 A1 | 12/2005 | Wiegner |
| 2006/0060612 A1 | 3/2006 | Antal |
| 2006/0086761 A1 | 4/2006 | Yang |
| 2006/0255078 A1 | 11/2006 | Seo et al. |
| 2007/0059407 A1 | 3/2007 | Spector |
| 2007/0284396 A1 | 12/2007 | Antal |
| 2009/0200342 A1 | 8/2009 | Albaum |
| 2009/0202692 A1 | 8/2009 | Chun |
| 2010/0006123 A1 * | 1/2010 | Simpson et al. ............. 134/25.2 |

(56) References Cited

U.S. PATENT DOCUMENTS

| | | |
|---|---|---|
| 2010/0176157 A1* | 7/2010 | Long et al. ............... 222/189.02 |
| 2010/0224650 A1 | 9/2010 | Antal, Sr. |
| 2011/0174758 A1 | 7/2011 | Gonzlez Sanchez et al. |

FOREIGN PATENT DOCUMENTS

| | | |
|---|---|---|
| WO | WO 9808065 | 2/1998 |
| WO | WO 2009012429 | 1/2009 |
| WO | WO2009029790 | 3/2009 |
| WO | WO 2009036049 | 3/2009 |

OTHER PUBLICATIONS

International Searching Authority (ISA/US), International Search Report and Written Opinion, International Application No. PCT/US2012/058400, Date of Mailing Jan. 2, 2013.

* cited by examiner

MEASURING DISPENSER FOR GRANULAR SEASONING MATERIAL AND METHOD OF SEASONING

TECHNICAL FIELD

The invention relates to a measuring dispenser for dispensing measured amounts of granular seasoning material and more particularly to a measuring dispenser for applying or dispersing measured quantities of granular seasoning onto food. The invention also relates to a method of seasoning.

BACKGROUND OF THE INVENTION

In the high-volume, quick-service food industry, uniformity of product quality is essential, as is efficiency of product preparation, to meet customer expectations and remain competitive in terms of food quality and price and speed of service. One key aspect of uniform product taste is the uniform application of any granular seasoning to a particular food item, in terms of a consistent quantity of seasoning applied to each food item and an even distribution of the seasoning over the surface of the food item.

Existing granular seasoning dispensers have significant shortcomings with respect to uniformity of dispensed quantity, speed of dispensing, and/or evenness of dispensing distribution. For example, the evenly spaced apart apertures of the pour opening of a traditional household salt shaker only provide for relatively even distribution over an area roughly the size and shape of the pour opening, and the lack of metered flow control makes such a shaker clearly inadequate to provide a consistent quantity of seasoning on each of a plurality of food items.

On the other hand, previous attempts to provide a metered seasoning dispenser have resulted in compromises to the ease and quickness of operation as well as the evenness of distribution. For example, one existing type of metered seasoning dispenser employs a metering chamber in direct communication with a dispensing outlet, the metering chamber separated from a much larger reservoir by a system of baffles, such that holding the dispenser in a filling position causes the metering chamber to be filled with a metered quantity of seasoning from the reservoir, inverting the dispenser from the filling position to a dispensing position causes only the metered quantity of seasoning to be dispensed, and then inverting the dispenser from the dispensing position back to the filling position causes the metering chamber to be filled again. This system is reasonably effective for providing a consistent quantity of seasoning for each dispensing cycle. However, the repeated action of inverting the dispenser back and forth to season a plurality of food items is somewhat awkward and time consuming, while the rotational inverting motion of the entire dispenser imparts trajectories to particles exiting the dispensing outlet that are difficult to predict and control, thus jeopardizing the even distribution of particles onto the food item.

A need therefore exists for an improved metered dispenser for granular seasoning that is quick and comfortable to operate and that provides consistently uniform distribution and a consistent quantity of particulate or granular seasoning onto the surface of a food item.

A dispenser used in a quick-service restaurant may be used over a hundred times in a day. Thus, there is a need for a dispenser that is very robust.

Many prior art dispensers tend to have conical deflectors for spreading seasoning. However, such deflectors do not achieve all the desired patterns for spreading seasoning. Consequently, there is a need for dispensers with non-conical deflectors.

SUMMARY OF THE INVENTION

In accordance with one aspect of the invention, a measuring dispenser for dispensing granular materials, including granular seasoning, is provided. The measuring dispenser includes a container having an end and an interior volume for holding granular material to be dispensed. A dispensing structure covers the end of the container, the dispensing structure having a first member with at least one dispensing aperture in communication with the interior volume of the container. A second member, having at least one dispensing aperture is provided, each of the second member dispensing apertures forming a chamber for holding granular material. A third member is provided having at least one dispensing aperture in communication with the exterior of the measuring dispenser. The second member is located between the first and third members and is rotatable relative to the first and third members. The first member dispensing aperture and the third member dispensing aperture are positioned such that the second member can be rotated to selectively align the first member dispensing aperture with the second member dispensing aperture permitting granular material in the first member dispensing aperture to move into the second member dispensing aperture and with the third member dispensing aperture permitting granular material in the second member dispensing aperture to move through the third member dispensing aperture.

In accordance with another aspect of the invention, the first member dispensing aperture has a raised rim extending towards the interior volume of the container. In accordance with another aspect of the invention, the first, second and third members are disc-shaped and arrayed in a stack with the first member on top, the second member beneath the first member and the third member beneath the second member. An actuator is provided for moving the first member dispensing aperture relative to the second member to cause granular materials to be deposited from the container into the first member dispensing aperture when the actuator is actuated. A baffle may be provided above the first member dispensing aperture so that the first member dispensing aperture moves underneath the baffle when the actuator is actuated. Typically, the baffle is sufficiently close to the raised rim of the first member dispensing aperture so that the baffle cooperates with the raised rim to cause granular materials in the container to fall into the first member dispensing aperture when the first member is moved, such as by operation of the actuator.

In one embodiment, the first member dispensing aperture has a rim extending into the interior volume of the container, the rim being raised around a portion of the circumference of the first member dispensing aperture.

In one embodiment, the measuring dispenser further includes an actuator, a yoke having a slot and connected to the actuator, a pin received in the slot so that movement of the actuator pulls the yoke and causes rotation of the third member relative to the second member. The slot may be sized to limit travel of the pin caused by movement of the actuator. The dispenser further includes in one embodiment a shaft for rotational movement of the first, second and third members about the shaft, wherein the yoke has a second slot in which the shaft is received. In another embodiment, the second slot of the yoke is sized to limit yoke travel caused by movement of the actuator. The shaft can have a key received in an opening in the second member, the opening for limiting the rotation of the shaft. The yoke may further include an expanded portion such that the expanded portion does not fit through an opening through which the yoke travels to thereby limit travel of the yoke. Thus, in one embodiment the measuring dispenser of the invention has a plurality of stop members that limit travel of the dispensing mechanism. This has the effect of distributing forces on multiple parts of the dispensing mechanism, thereby reducing wear on any single portion thereof.

A suitable handle is provided for the measuring dispenser and the handle can also be positioned so as to limit travel of the actuator.

In accordance with another aspect of the invention, the first, second and third members each have a plurality of dispensing apertures. Those dispensing apertures are arrayed in a predetermined fashion to facilitate dispensing. In one embodiment, actuation of the actuator causes rotation of the first member relative to the interior volume of the container, the path of travel of the first member dispensing aperture during the rotation does not intersect the path of travel of the other first member dispensing apertures.

In accordance with another aspect of the invention, the measuring dispenser includes at least one deflector associated with a respective one of the third member dispensing apertures for deflecting granular materials dispensed therethrough laterally or sideways. In addition, at least one deflector is associated with another one of the third member dispensing apertures for deflecting granular materials dispensed therefrom in a direction radially inwardly or outwardly. Typically, a separate dedicated deflector will be provided for each of the third member dispensing apertures.

In accordance with another aspect of the present invention, a method of seasoning food is provided. The method includes providing a seasoning dispenser in accordance with the invention, holding the container containing granular seasoning over a food item to be seasoned, moving the handle of the dispensing structure to cause rotation of the second member relative to the first and third members and aligning at least one third member dispensing aperture with the at least one second member dispensing aperture while moving the handle and causing seasoning to be dispensed from at least one second member dispensing aperture.

The dispenser in accordance with one aspect of the invention can achieve consistent quantities of particulate or granular seasoning with each dispense. There are three different features in accordance with different aspects of the invention that promote uniform, consistent and reliable dispensing of granular seasoning. One feature is a rim partially raised around the first member aperture. Another feature is pushing elements that cooperate with the partially raised rim. A third feature is radially-staggered apertures.

The dispenser of the invention also has a simple, but efficient deflector arrangement composed of a dedicated small deflector for each dispensing chamber to promote uniform dispersion of seasoning. This provides for a deflector that can be made with a small amount of material, thereby allowing for more economical and efficient construction.

The dispenser of the invention also has a dispensing mechanism with multiple stop members to help ensure a long life to the dispenser.

Foods will expel vapor containing moisture and fat during cooking and immediately after removing from heat. The vapors will build-up on seasoning applicators using open holes to meter and distribute granular seasoning. This invention prevents or substantially prevents migration of vapor into the metering area of the dispenser and distribution is added with centrifugal force and gravity. Multiple cavities reduce the variation of the total amount of granular seasoning dispensed.

BRIEF DESCRIPTION OF THE DRAWINGS

FIG. 3*a* is a side elevation view. FIG. 3*b* is a schematic view of the dispensing mechanism from above. FIG. 5 is an elevation view of the dispensing mechanism along line 5 of FIG. 3*b*.

FIG. 4*a* is a side elevation view. FIG. 4*b* is a schematic view of the dispensing mechanism from above. FIG. 6 is an elevation view of the dispensing mechanism along line 6 of FIG. 4*b*.

DETAILED DESCRIPTION OF THE INVENTION

Figure 1:
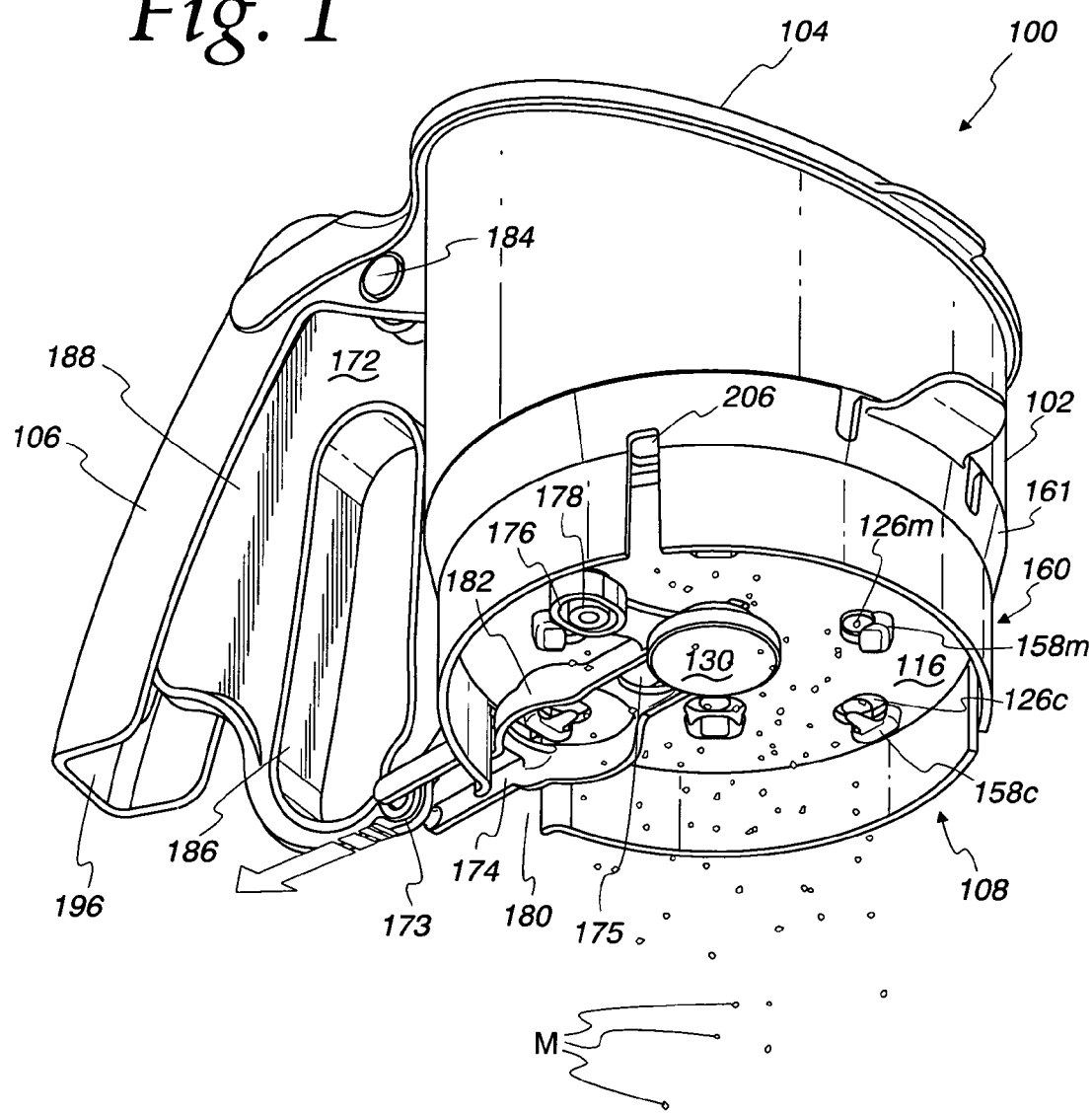
FIG. 1 is a perspective view of a first dispenser of the invention.

In a first embodiment of the invention, a dispenser 100 is provided as illustrated in FIGS. 1-6 and 8-9. Dispenser 100 has a container 102, a pivotable lid 104, a handle 106, and a dispensing mechanism 108. Container 102 has an open bottom 110, which is covered by dispensing mechanism 108. Container 102 is intended to contain granular materials to be dispensed by dispenser 100. Granular materials include, for example, salt, pepper, sugar, other seasonings, grains, powders and colorants.

Dispensing mechanism 108 has a first member 112, a second member 114 and a third member 116. First member 112 is the member that is closest to container 102. First, second and third members 112, 114 and 116 have first, second and third member dispensing apertures 122, 124 and 126, selected ones of which are sometimes referred to as 122*c,m*, 124*c,m* and 126*c,m*, respectively. Second member 114 is rotatable about a pivot axis 128 relative to first and third members 112 and 116. In practice, preferably, first and third members 112 and 116 rotate while second member 114 is stationary, but alternatively second member 114 could rotate while first and third members 112 and 116 are stationary or second member 114 could rotate in a direction opposite to first and third members 112 and 116, for example.

The first, second and third member dispensing apertures 122, 124 and 126 typically have the same pattern of distribution in their respective members 112, 114 and 116 so that the pattern of first member dispensing apertures 122 can be aligned with the pattern of second member dispensing apertures 124 and the pattern of third member dispensing apertures 126 can be aligned with the pattern of second member dispensing apertures 124 by rotation of the first and third members 112 and 116 relative to second member 114 around pivot axis 128, respectively.

The members are generally in the shape of flat circular discs, as shown and maintained in a stacked arrangement by a fastener 130. Fastener 130 is preferably removable to permit disassembly of dispensing mechanism 108. Preferably fastener 130 connects to a threaded pivot 132. Preferably, first and third members 112 and 116 are rotatable around pivot 132 and pivot axis 128 passes through fastener 130 and pivot 132. Threaded pivot 132 as shown is integral to member 112, but it can be separate. Pivot 132 also includes a key 134. Third member 116 has an opening 135 for pivot 132. Opening 135 includes a keyway 136 matching key 134. Second member 114 has an opening 138 through which pivot 132 and key 134 passes. Opening 138 limits the rotation of pivot 132 and by extension the rotation of first and third members 112 and 116, respectively, to second member 114.

The patterns of dispensing apertures 122, 124, and 126 form squares as illustrated, such that members 112, 114 and 116 can be rotated so that the patterns on the first and second members 112 and 114 and the patterns on the second and third members 114 and 116 can be selectively aligned by rotation. In one embodiment, members 112, 114 and 116 have at least one dispensing aperture 122, 124 and 126, respectively. The number of dispensing apertures per member can be as desired, ranging from one to eight or more, for example. As illustrated, the number of dispensing apertures per member is eight.

Figure 5:
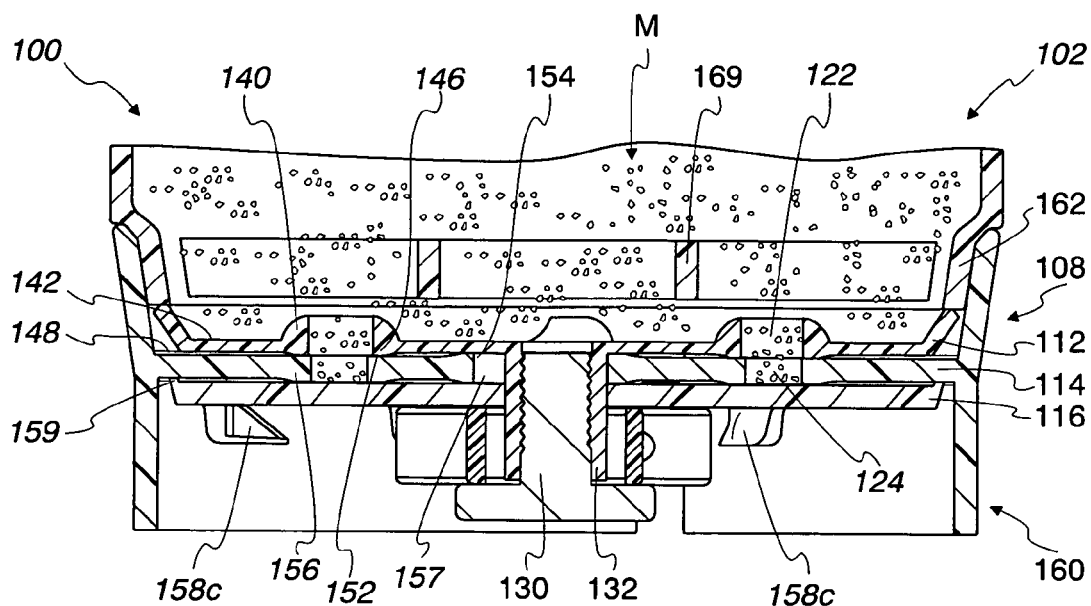
Figure 9:
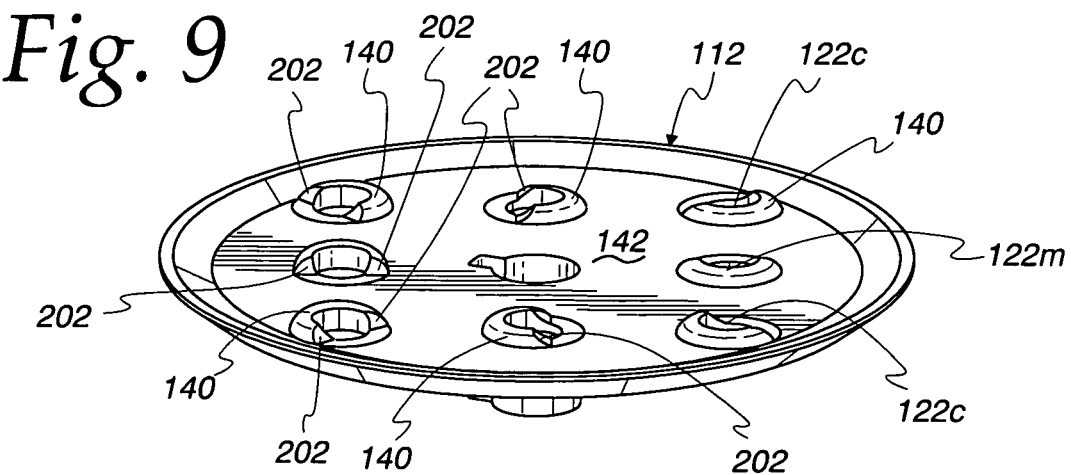
FIG. 9 is a perspective view of a first member of the dispensing mechanism from the side and above.

Dispensing apertures and openings can have raised rims as described below. In particular, as shown in FIGS. 5 and 9, dispensing apertures 122 have rims 140 that are raised around part of the perimeter of the trailing portions during dispensing movement of corresponding dispensing apertures on side 142 of first member 112 facing container 102. Rims 140 are partially raised relative to side 142. Partially-raised rims 140 help fill apertures 122 during dispensing as described later. As illustrated, rim 140 typically is raised around about 33% or more of the circumference of aperture 122 on side 142, more typically at least about 50% to about 60% or 70% around the trailing portions of member 112. A typical height for rims 140 is about 0.4 mm. On side 144 of member 112, opposed to side 142, rims 146 are provided that are raised around the entire perimeter of apertures 122 relative to side 144. Member 114 has a side 148 facing container 102 and a side 150 facing away. Rims 152 of second member dispensing apertures 124 on side 148 are not raised. Rim 154 of opening 138 on side 148 is raised. Rims 146 and 154 are raised by substantially the same amount, which in the illustrated embodiment is a height of about 0.4 mm. Rim 154 is configured to allow free movement of the member 116 relative to member 114. Rims 146 provide strength to member 112 adjacent apertures 122 to reduce friction and wear. Apertures 124 and opening 138 have rims 156 and 157, respectively, on side 150. Rims 156 and 157 are raised by substantially the same amount. Member 116 does have a raised rim 159 around its periphery to substantially match the height of rims 156 and 157, which in the illustrated embodiment is a height of about 2 mm (note the figure may not be to scale). Rims 156 and 157 provide uniform and level points on the same surface. Elevated rims 156 and 157 prevent binding between surfaces by any granular material located on member 116. The rims of apertures 126 are level with member 116 as are the rims for opening 135.

Figure 3A:
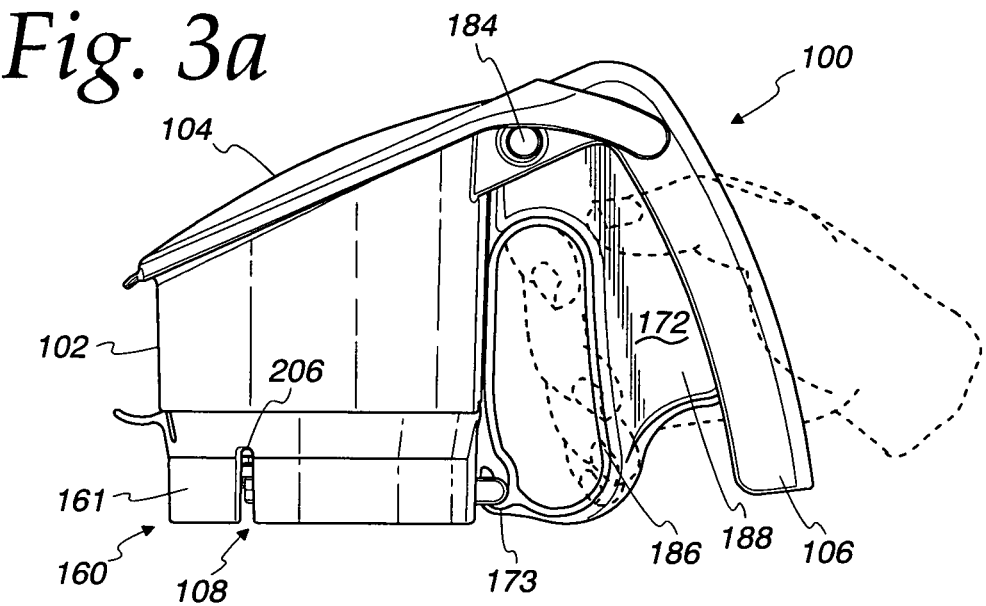
FIGS. 3*a*, 3*b* and 5 show the first dispenser when a dispensing mechanism is in its rest position.
Figure 3B:
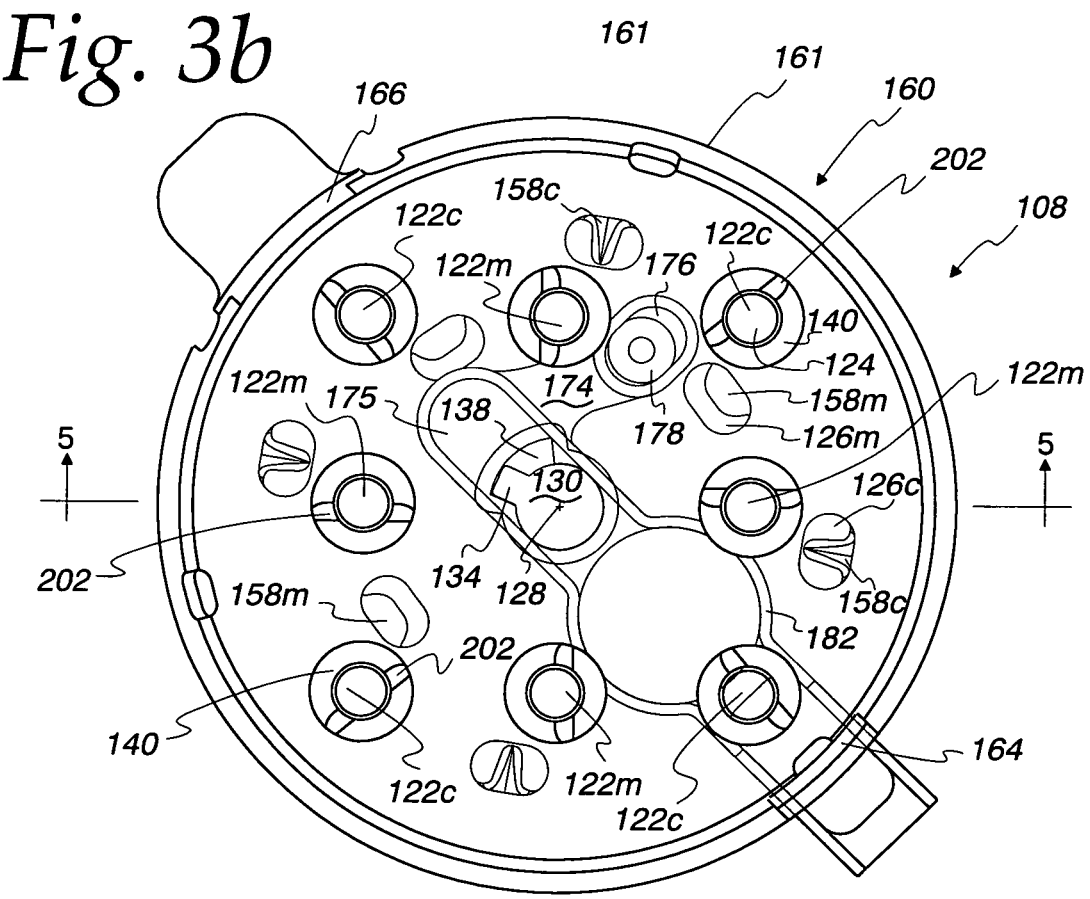

Apertures 122, 124 and 126 may be of different size and shape. Apertures 122 and 124 are substantially circular or substantially cylindrical when taking into account the thickness of members 112 and 114, respectively. Typically, apertures 122 are circular and have the same or a slightly larger radius and circumference than circular apertures 124. Apertures 122 and 124 are laid out in the same pattern such that the area of apertures 124 are contained within the area of apertures 122 when viewed from above as can be seen in FIG. 3b. Apertures 124 are sized to provide a desired amount of granular material with each dispense. Typical diameter values for circular apertures 122, 124 and 126 are 7.0, 5.4 and 7.0×9.0 mm, respectively.

Apertures 126 can be substantially circular or substantially oval, for example. Preferably aperture 126 is substantially oval, e.g. two semicircles of the same radius joined by a rectangle, with two axes of symmetry, a major and a minor. The oval has a major axis which is substantially tangential to pivot axis 128 and a minor axis which is substantially radial to pivot axis 128. The minor axis is the same or larger than the diameter of apertures 124 such that granular materials being dispensed from apertures 124 are not impeded by the rim of apertures 126. As illustrated, apertures 122, 124 and 126 are laid out in a square or rectangle pattern with apertures substantially in the corner of the rectangle and apertures substantially in the middle of the side of the rectangle. The square or rectangle is sized such that corner apertures 122c do not overlap middle apertures 124m and middle apertures 122m do not overlap corner apertures 124c as member 112 is rotated relative to member 114 during a dispensing operation as shown in FIGS. 3a and 4b. Similarly, corner apertures 126c do not overlap middle apertures 124m and middle apertures 126m do not overlap corner apertures 124c as member 116 is rotated relative to member 114 during a dispensing operation.

Third member 116 has a plurality of deflectors 158 for deflecting and spreading granular materials during dispensing. Preferably, there is a deflector 158 associated with a separate one of each of apertures 126. Specifically corner apertures 126c are associated with deflectors 158c and middle apertures 126m are associated with deflectors 158m. As illustrated, deflectors 158, sometimes referred to as 158c and 158m, attach to member 116 along a side of apertures 126 facing away from pivot 132 and extend beneath apertures 126, but they could be attached on the side facing pivot 132. Corner deflectors 158c are designed to deflect dispensed granular materials tangentially with respect to pivot axis 128. Middle deflectors 158m are designed to deflect granular materials radially with respect to pivot axis 128. Middle deflectors 158m as illustrated deflect granular materials inwardly, but they could be oriented to deflect granular materials outwardly. Corner deflectors 158c are narrow relative to middle deflectors 158m to achieve the desired tangential deflections. The types and orientation of deflectors 158 can vary depending on the pattern of apertures 126 and on the area over which granular material is to be dispensed. By matching individual deflectors 158 to individual apertures 126, it is possible to control the dispersion of dispensed granular materials to a greater degree than prior art dispensers which had a single deflector. In addition, individual deflectors 158 represent a significant savings in material costs relative to the prior art.

The thickness of member 112 determines the portion of granular seasoning to be dispensed. Replacement of this member 112 with a thicker or thinner member 112 allows the same dispenser to be modified to deliver greater or lesser amounts, respectively, of seasoning. In addition, larger or smaller apertures 122, 124 and 126, respectively, in members 112, 114 and 116, respectively, also allow greater or lesser amounts of seasoning to be dispensed.

Dispensing mechanism 108 may be attached to container 102 by any suitable structure. As illustrated dispensing mechanism 108 is part of a closure 160 (for open bottom 110) having an outer body 161. The upper half of outer body 161 tapers towards the middle to match a recessed taper 162 of container 102. Outer body 161 has two tabs 164 and 166 which attach dispensing mechanism 108 to container 102 by engaging two slots in container 102. One of the two slots is not illustrated; the other slot is slot 170. As illustrated, second member 114 is integral to closure 160.

Dispenser 100 also has baffles 171. Baffles 171 may be located in container 102 generally, within open bottom 110 more specifically, or within closure 160. Baffles 171 may be arranged in a spoke pattern and be connected to a support ring 169. Preferably the number of baffles 171 matches the number of apertures 122.

Dispensing mechanism 108 is actuated by moving a lever 172. Lever 172 is removably connected to yoke 174 by hook 173. Yoke 174 has slots 175 and 176. Pivot 132 is received in slot 175. Member 116 has a pin 178 attached or integral to it. Pin 178 is received in slot 176. Outer body 161 extends downwardly so that yoke 174, pin 178, and deflectors 158 are raised above a countertop or other support surface when dispenser 100 is placed upright on the countertop or support surface. Outer body 161 has an opening 180 through which yoke 174 connects to a finger grip 186. Yoke 174 has a circular portion 182. Circular portion 182 is wider than opening 180 and the rest of yoke 174 to not deflect or minimize deflecting of dispensed granular materials and to limit the movement of yoke 174 outwardly.

Lever 172 rotates around removable pivot 184 in handle 106. Lever 172 has finger grip 186 which is an opening within the body 188 of lever 172. Lever body 188 is biased against or towards the body of container 102 by a biasing element 190, which can be any suitable spring for pushing the lever body against or towards the body of container 102. Preferably, biasing element 190 pivots around pivot 184 at one end 192. The opposite end 194 of biasing element 190 moves within a track 196 within handle 106. Biasing element 190 has a bend 198 of greater than 45 degrees ($\pi/4$ radians), preferably greater than 60 degrees ($\pi/3$ radians), and most preferably greater than about 75 degrees ($5\pi/12$ radians) when installed. Bend 198 is located adjacent pin 200 of handle 106.

Operation of the dispensing mechanism is described next. FIGS. 3a, 3b, 5 and 8 illustrate dispenser 100 with dispensing mechanism 108 in its "rest" position. In the rest position, apertures 122 and 124 are aligned permitting granular material to flow out of container 102, through apertures 122 and into apertures 124. In the rest position, granular materials cannot flow through apertures 124 to the exterior because of member 116; apertures 124 are not aligned with apertures 126. Adjacent apertures 122 are separated by baffles 171 when looking into container 102. In other words, each aperture 122 is located between an adjacent pair of baffles 171. As described below, baffles 171 and member 114 are stationary while members 112 and 116 rotate. However, it is conceivable that baffles 171 and member 114 rotate together about their axis during a dispensing operation while members 112 and 116 are stationary.

Figure 2:
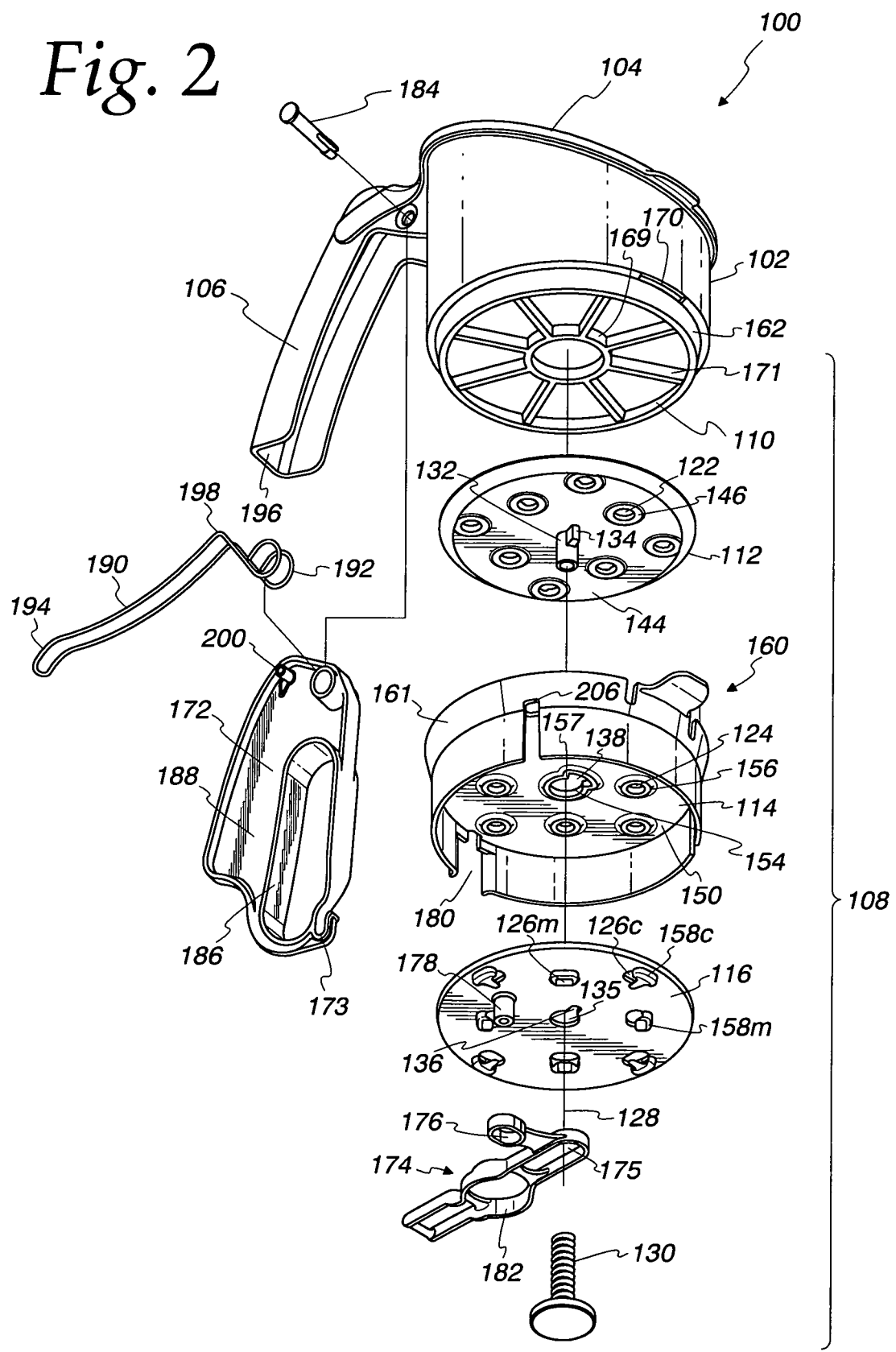
FIG. 2 is an exploded perspective view of the first dispenser.
Figure 4A:
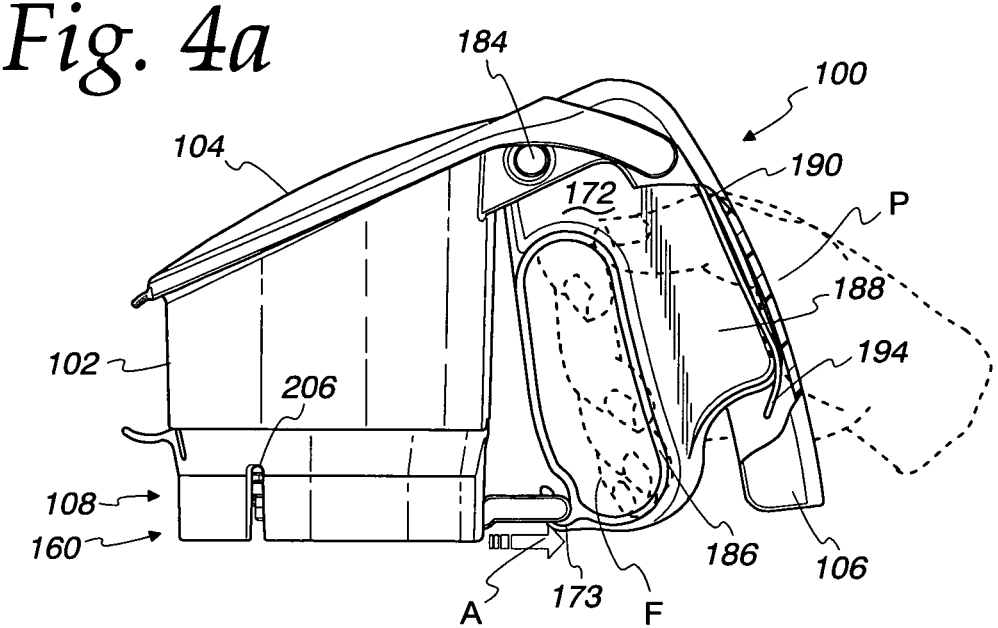
FIGS. 4*a*, 4*b* and 6 show the first dispenser when the dispensing mechanism is fully actuated.
Figure 4B:
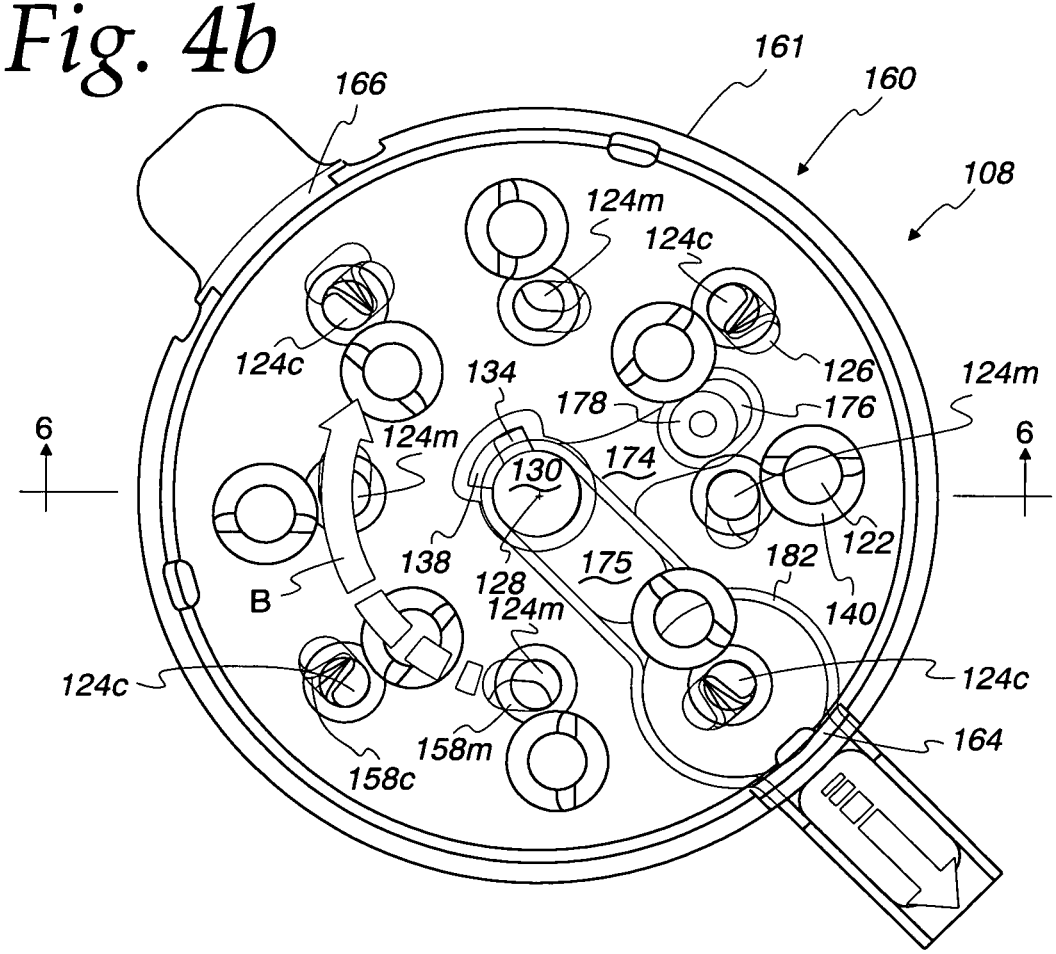

Referring to the Figures generally and in particular to FIGS. 2 and 4a and 4b, a user of dispenser 100 initiates a dispensing operation by moving finger grip 186 in the direction indicated by the translation arrow A in FIG. 4a (which can be done by a user squeezing together lever 172 and handle 106 with the user's hand having the user's fingers F inserted into finger grip 186 and the user's palm P resting against handle 106. The movement causes lever 172 to pivot around pivot 184. Pin 200 then pushes on spring biasing element 190 and causes it to bend more and end 194 to move upwardly within track 196. The movement of lever 172 then causes hook 173 to pull yoke 174 outwardly. Yoke 174 in turn pulls pin 178, which follows yoke 174 while moving initially to the right within slot 176. The movement of pin 178 causes the rotation of members 116 and 112 relative to member 114 and baffles 171 clockwise as shown by the rotation arrow B in FIG. 4b.

As shown in FIG. 9, rims 140 are raised and have an outward ramp 202 on the leading portion of aperture 122 as member 112 rotates clockwise. The rotation of member 112 causes granular materials to be pushed up by raised rim 140 and ramp 202. As the user further pulls on finger grip 186, member 112 is further rotated which causes apertures 122 to pass under a baffle 171. Ramps 202 and baffles 171 then cooperate to push granular material in container 102 into apertures 122 and to prevent or help break up any clumps of granular material. For purposes of the invention, apertures 122 can pass under a baffle because first member 112 is stationary and baffles 171 rotate as a whole about an axis or because baffles 171 are stationary and first member 112 rotates about its axis, for example.

Figure 6:
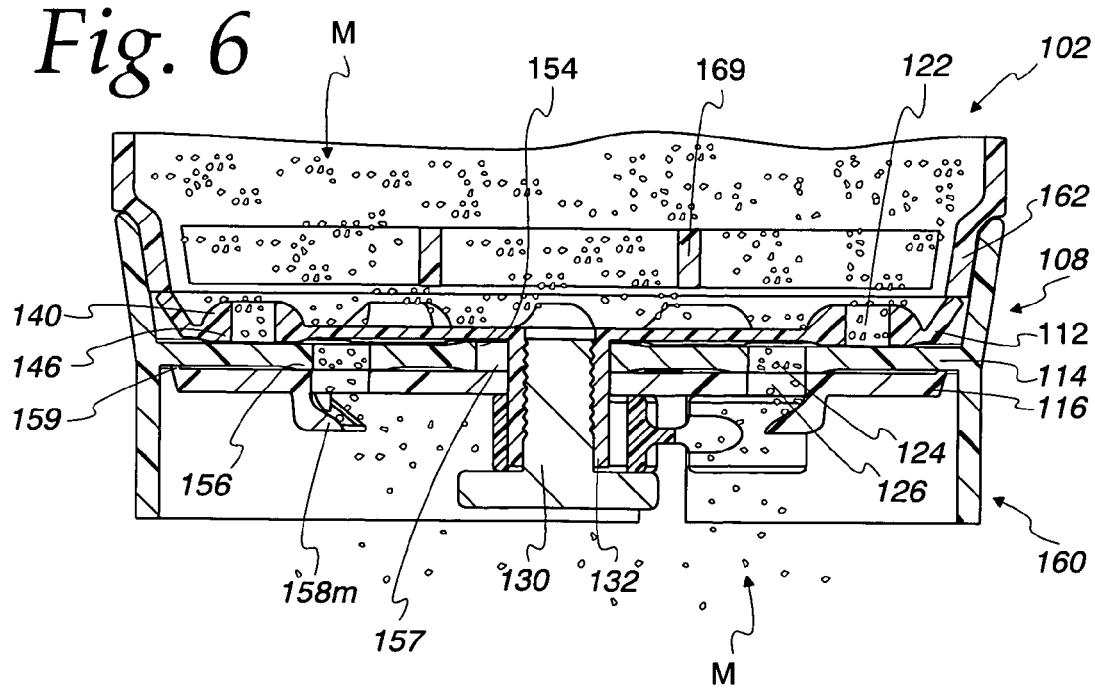

When a user fully pulls on finger grip 186, dispenser 100 dispenses granular material M as shown in FIG. 1. Dispensing mechanism 108, at this point in the dispensing operation, is illustrated in FIGS. 4b and 6. Apertures 124 and 126 are aligned permitting granular materials M to drop out of aperture 124, some of which will then strike and be directed by deflectors 158, and thereby dispensing and distributing the granular materials over a controlled area.

After the dispense, a user can complete the dispensing operation by releasing finger grip 186. Members 112 and 116 will then rotate back (counterclockwise) relative to member 114 to the positions illustrated in FIGS. 3b, 5 and 8. As member 112 rotates back, raised rims 140 tend to push granular materials into apertures 122. The portion of raised rim 140 facing aperture 122 is preferably substantially vertical. Another feature that assists with filling of apertures 122 and 124 is that adjacent apertures 122 are staggered radially from pivot axis 128, such that adjacent apertures do not travel on the same path, which could result in inconsistent filling of apertures 122 and 124. Preferably adjacent apertures 122 are staggered such that their paths do not overlap during a dispense operation. At the rest position, apertures 122 and 124 are aligned permitting granular materials to drop from aperture 122 into aperture 124.

Dispensing mechanism 108, including handle 106, lever 172 and finger grip 186 enables dispensing with minimal movement and maximum visibility of the food during dispensing. This enables better operation, more accurate dispensing of seasoning onto the intended food item or items and reduced operator fatigue.

An important feature of this embodiment is a number of cooperating or multiple stop mechanisms. Specifically, dispensing mechanism 108 limits or stops the rotation of members 112 and 116 relative to member 114 in several ways. First, movement of lever body 188 is limited by handle 106 and container 102. Second, rotation of key 134 is limited by opening 138. Third, the movement of yoke 174 is limited by pivot 132 in slot 175. Fourth, the rotation of member 116 is limited by pin 178 in slot 176. Fifth, movement of yoke 174 is limited by circular portion 182 and opening 180. Dispensing mechanism 108 can have a primary stop mechanism which can be any of the above mechanisms and combinations thereof with other mechanisms being redundant and coming into play only as the primary stop mechanism wears. Having multiple stop mechanisms distributes the stopping forces over the multiple stop surfaces to provide for a more durable and longer lasting dispensing mechanism 108. Advantageously, one or more of the stop mechanisms makes a noise during ordinary use by impact when maximum movement is achieved which signifies to the user that finger grip 186 can be released or that dispenser 100 is ready to dispense again.

Figure 7:
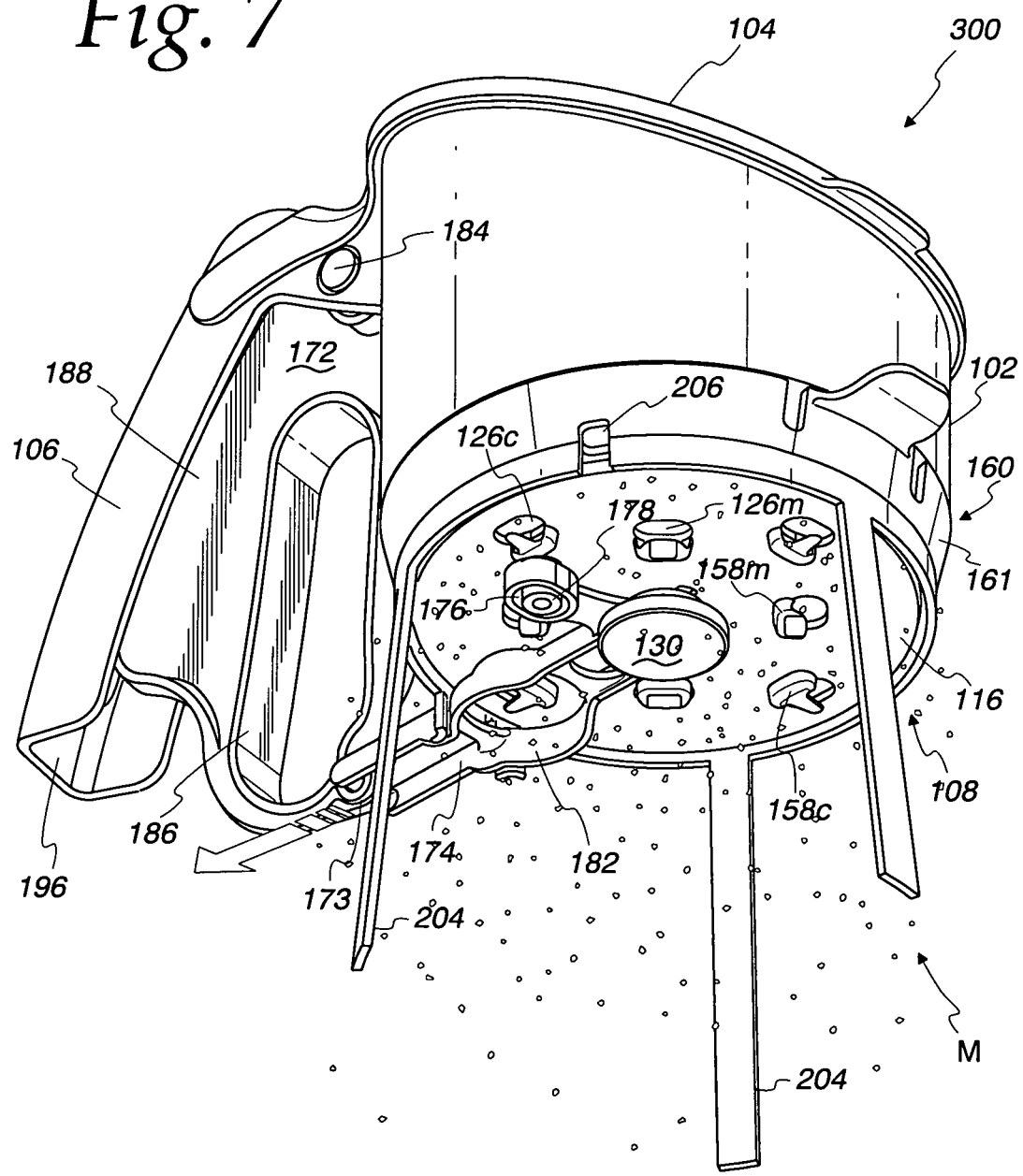
FIG. 7 is a perspective view of a second dispenser of the invention.
Figure 8:
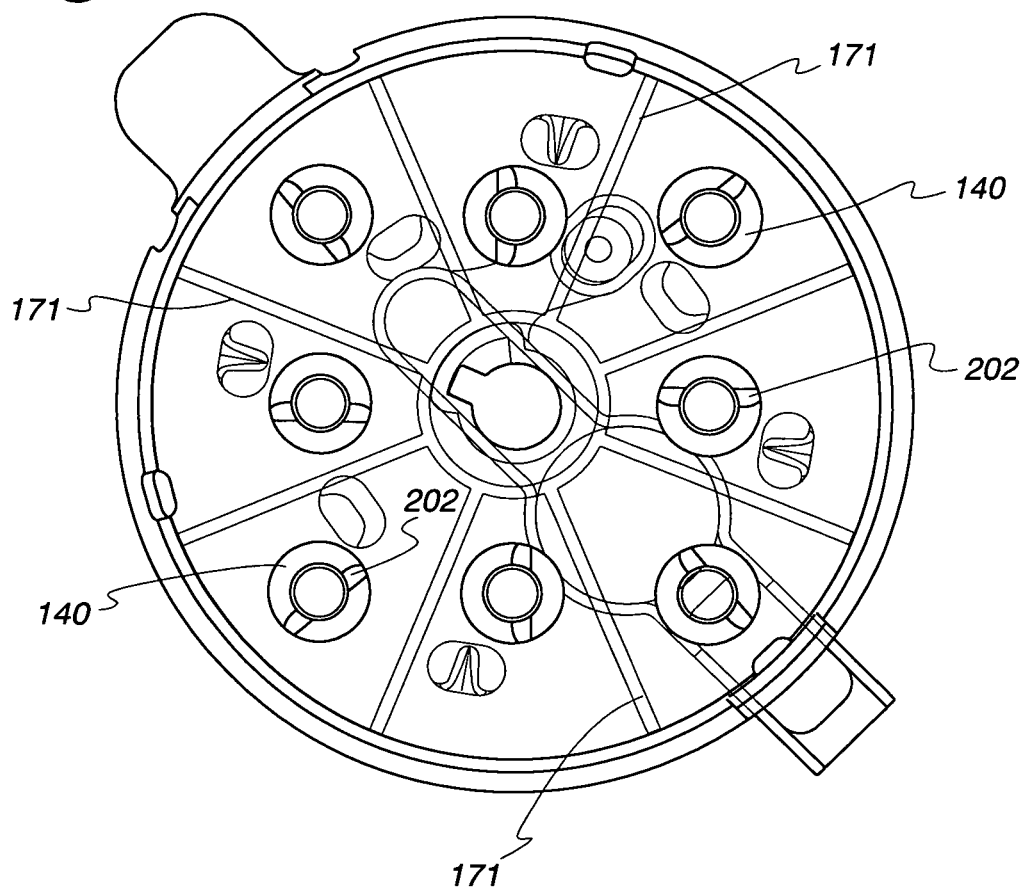
FIG. 8 corresponds to FIG. 3*b* and also shows pushing members.

A second version of dispenser 100 is illustrated in FIG. 7 as dispenser 300. In this embodiment, deflectors 158 are located inwardly of apertures 126. Deflectors 158*m* then deflect granular materials outwardly. In addition, outer body 161 has legs 204 which keep the dispensing mechanism 108 off of countertops. In addition, legs 204 may be useful to maintain a minimum distance between the dispenser and foods to be seasoned, for example.

Both versions of dispenser 100 include openings 206 in outer body 161, which permit granular materials between first and second members 112 and 114 to exit via openings 206. Openings 206 help prevent granular materials from accumulating between first and second members 112 and 114 and thereby binding dispensing mechanism 108.

Although the components of dispenser 100 may be composed of any suitable material to facilitate their respective functions in accordance with the invention, dispenser 100 is substantially composed of a substantially rigid, food-safe material, such as a food-grade polymer, such as polycarbonate, nylon or various polymer blends as known in the art, the parts of which may be formed by any suitable manufacturing process, including, for example, injection molding. The food-safe material used is preferably translucent or clear, especially for container 102, so that the level of granular seasoning material can be visually discerned through the side of container 102. Biasing element 190 is preferably composed of a food-grade metal suitable for springs such as stainless steel.

In another aspect of the invention, a method for seasoning food is provided. The method includes holding container 100 or 300 containing granular seasoning, over a food item to be seasoned. Next, the user squeezes a handle of the dispensing mechanism causing rotation of the second member relative to the first and third members and aligns the at least one third member aperture with the at least one second member aperture. The alignment causes seasoning to be dispensed from the at least one second member aperture. The dispensed seasoning is deflected and dispersed by the deflectors over the food item. A noise is generated by the dispenser responsive to the squeezing. The user then releases the handle and the biasing element causes the second member to rotate relative to the first and third members and aligns the at least one first member aperture with the at least one second member aperture causing seasoning to fill the at least one second member aperture.

While the invention has been described with respect to certain preferred embodiments, as will be appreciated by those skilled in the art, it is to be understood that the invention is capable of numerous changes, modifications and rearrangements and such changes, modifications and rearrangements are intended to be covered by the following claims.

What is claimed is:

1. A measuring dispenser comprising:
    a container having an end and an interior volume for holding granular material to be dispensed; and
    a dispensing structure proximate the end of the container, the dispensing structure having a first member having a plurality of first member dispensing apertures in communication with the interior volume, a second member having a plurality of second member dispensing apertures, each second member dispensing aperture forming a chamber for holding granular material, and a third member having a plurality of third member dispensing apertures, in communication with the exterior of the measuring dispenser; the second member located between the first and third members and rotatable relative to the first and third members, the first member dispensing apertures and the third member dispensing apertures positioned such that the second member can be rotated to selectively align the first member dispensing apertures with the second member dispensing apertures permitting granular material in the first member dispensing apertures to move into the second member dispensing apertures and with the third member dispensing apertures permitting granular material in the second member dispensing apertures to move through the third member dispensing apertures, and a plurality of baffle members above the first member for pushing granular materials into the first member dispensing apertures.

2. The measuring dispenser of claim 1 wherein the first member has a raised rim around the perimeter of at least two of the first member dispensing apertures, each of the raised rims extending around only part of the perimeter of the associated first member dispensing apertures, the raised rims extending towards the interior volume.

3. The measuring dispenser of claim 2 further comprising a baffle and an actuator, wherein each first member dispensing aperture moves underneath one of the baffle members during operation of the actuator to dispense granular materials.

4. The measuring dispenser of claim 3 wherein each of the first member dispensing apertures has one of the raised rims and the baffle members are sufficiently close to the raised rims to cooperate to cause granular materials to fall into the first member dispensing apertures during operation of the actuator.

5. A measuring dispenser comprising:
    a container having an end and an interior volume for holding granular material to be dispensed; and
    a dispensing structure proximate the end of the container, the dispensing structure having a first member having at least one first member dispensing aperture in communication with the interior volume, a second member having at least one second member dispensing aperture, each second member dispensing aperture forming a chamber for holding granular material and a third member having at least one third member dispensing aperture in communication with the exterior of the measuring dispenser; the second member located between the first and third members and rotatable around an axis relative to the first and third members, the first member dispensing aperture and the third member dispensing aperture positioned such that the second member can be rotated to selectively align the first member dispensing aperture with the second member dispensing aperture permitting granular material in the first member dispensing aperture to move into the second member dispensing aperture and with the third member dispensing aperture permitting granular material in the second member dispensing aperture to move through the third member dispensing aperture;
    the dispensing structure further comprising an actuator, a yoke having a slot having a longitudinal dimension and a depth dimension and connected to the actuator, a pin connected to the third member, located off-axis and received in the slot such that moving the actuator pulls the yoke, causes the pin to travel longitudinally within the slot and relative to the slot and causes rotation of the third member relative to the second member around the axis.

6. The measuring dispenser of claim 5 wherein the longitudinal dimension of the slot is sized to limit the rotation of the third member.

7. The measuring dispenser of claim 5 further comprising a shaft for pivotally mounting the first and third members, wherein the yoke has a second slot in which the shaft is received.

8. The measuring dispenser of claim 7 wherein the second slot is sized to limit the travel of the yoke due to the movement of the actuator.

9. The measuring dispenser of claim 5 further comprising a handle, the handle positioned so as to limit the travel of the actuator.

10. The measuring dispenser of claim 5 further comprising a shaft for pivotally mounting the first, second and third members, the shaft having a key received in an opening in the second member, the opening limiting the rotation of the shaft.

11. The measuring dispenser of claim 5 wherein the yoke further comprises a wide portion and a narrow portion such that the wide portion does not fit through an opening through which the narrow portion of the yoke travels and thereby limits the travel of the yoke.

12. A measuring dispenser comprising:
a container having an end and an interior volume for holding granular material to be dispensed;
a dispensing structure proximate the end of the container, the dispensing structure having a first member having a plurality of first member dispensing apertures in communication with the interior volume, a second member having a plurality of second member dispensing apertures, each second member dispensing aperture forming a chamber for holding granular material and a third member having a plurality of third member dispensing apertures in communication with the exterior of the measuring dispenser; the second member located between the first and third members and rotatable relative to the first and third members, the first member dispensing apertures and the third member dispensing apertures positioned such that the second member can be rotated to selectively align the first member dispensing apertures with the second member dispensing apertures permitting granular material in the first member dispensing apertures to move into the second member dispensing apertures and with the third member dispensing apertures permitting granular material in the second member dispensing aperture to move through the third member dispensing apertures; and
a plurality of separate deflectors arranged in an array for deflecting the dispensed granular materials.

13. The measuring dispenser of claim 12 further comprising an axis around which the second member rotates relative to the first and third members wherein at least one deflector is oriented to deflect granular material dispensed via the third member dispensing apertures tangentially to the axis and at least another deflector is oriented to deflect granular material dispensed via the third member apertures radially to the axis.

14. The measuring dispenser of claim 12 wherein there is a deflector for each of the third member dispensing apertures.

15. The measuring dispenser of claim 12 further comprising an axis around which the second member rotates relative to the first and third members, wherein the plurality of deflectors comprises deflectors oriented to deflect the granular materials in a non-radial direction with respect to the axis of rotation.

16. The measuring dispenser of claim 12 further comprising an axis around which the second member rotates relative to the first and third members, wherein the plurality of deflectors comprises deflectors oriented to deflect the granular materials inwardly towards the axis of rotation.

17. The measuring dispenser of claim 12 wherein there is a separate deflector for each of the third member dispensing apertures, each deflector capable of deflecting dispensed seasoning from a different one of the third member dispensing apertures.

18. The measuring dispenser of claim 12 wherein the dispensing structure further comprises an axis about which the second member rotates relative to the first and third members, wherein the plurality of deflectors includes at least one deflector oriented to deflect the granular materials in a non-radial direction with respect to the axis of rotation and at least one deflector oriented to deflect the granular materials inwardly towards the axis of rotation.

19. A measuring dispenser comprising:
a container having an end and an interior volume for holding granular material to be dispensed; and
a dispensing structure proximate the end of the container, the dispensing structure having a first member having at least one first member dispensing aperture in communication with the interior volume, a second member having at least one second member dispensing aperture, each second member dispensing aperture forming a chamber for holding granular material and a third member having at least one third member dispensing aperture in communication with the exterior of the measuring dispenser; the second member located between the first and third members and rotatable relative to the first and third members, the first member dispensing aperture and the third member dispensing aperture positioned such that the second member can be rotated to selectively align the first member dispensing aperture with the second member dispensing aperture permitting granular material in the first member dispensing aperture to move into the second member dispensing aperture and with the third member dispensing aperture permitting granular material in the second member dispensing aperture to move through the third member dispensing aperture, and a raised rim around only a portion of each of the periphery of the first member dispensing apertures, the rim extending towards the interior volume.

20. The measuring dispenser of claim 19 wherein the first member dispensing aperture is circular in shape, and the raised rim is raised around only part of the circumference.

21. The measuring dispenser of claim 20 wherein the raised rim has a ramp extending outwardly from the first member dispensing aperture.

22. A measuring dispenser comprising: a container having an end and an interior volume for holding granular material to be dispensed; and a dispensing structure proximate the end of the container, the dispensing structure having a first member having a plurality of substantially circular, first member dispensing apertures in communication with the interior volume, a second member having a plurality of substantially circular, second member dispensing apertures, each second member dispensing aperture forming a chamber for holding granular material and a third member having at least one third member dispensing aperture in communication with the exterior of the measuring dispenser; the second member located between the first and third members and rotatable relative to the first and third members, the first member dispensing aperture and the third member dispensing aperture positioned such that the second member can be rotated to selectively align the first member dispensing aperture with the second member dispensing aperture permitting granular material in the first member dispensing aperture to move into the second member dispensing aperture and with the third member dispensing aperture permitting granular material in the second member dispensing aperture to move through the third member dispensing aperture;

said dispensing structure having a plurality of deflectors.

23. The measuring dispenser of claim 22 further comprising an actuator, wherein actuation of the actuator causes rotation of the first member relative to the interior volume, the path of travel of one first member dispensing aperture during the rotation not intersecting the paths of travel of the other first member dispensing apertures.

24. The measuring dispenser of claim 22 further comprising a shaft for pivotally mounting the first, second and third members wherein the first member apertures are staggered radially from the shaft.

25. The measuring dispenser of claim 22 wherein the dispensing structure further comprises an axis around which the second member rotates relative to the first and third members, wherein the third dispensing member apertures are substantially oval, and wherein the third dispensing member apertures are longer tangentially than radially with respect to the axis.

26. The measuring dispenser of claim 25 wherein some of the deflectors are oriented to deflect dispensed granular materials in a non-radial direction with respect to the axis of rotation.

27. The measuring dispenser of claim 25 wherein some of the deflectors are oriented to deflect the granular materials inwardly towards the axis of rotation.

28. A method of seasoning food with a measuring dispenser comprising a container having an interior volume for holding granular seasoning to be dispensed, a dispensing structure proximate an end of the container, a baffle above the dispensing structure, the dispensing structure having a first member below the baffle and having at least one first member dispensing aperture in communication with the interior volume, a second member having at least one second member dispensing aperture forming chambers for holding granular materials and a third member having at least one third member dispensing aperture in communication with the exterior of the measuring dispenser; the second member between the first and third members and rotatable relative to the first and third members, the at least one first member dispensing aperture and the at least one third member dispensing aperture positioned such that the second member can be rotated to selectively align the at least one first member dispensing aperture with the at least one second member dispensing aperture permitting granular materials in the at least one first member dispensing aperture to move into the at least one second member dispensing aperture and with the at least one third member dispensing aperture permitting granular materials in the at least one second member dispensing aperture to move through the at least one third member dispensing aperture, the method comprising:

holding the container containing granular seasoning over a food item to be seasoned;

rotating the second member and the baffle relative to the first and third members such that the at least one first member dispensing aperture moves underneath the baffle; and aligning the at least one third member dispensing aperture with the at least one second member dispensing aperture to cause seasoning to be dispensed from the at least one second member dispensing aperture.

29. The method of seasoning food of claim 28 further comprising pushing the granular seasoning up a ramp around the first member dispensing aperture.

30. The method of seasoning food of claim 28 further comprising pushing granular seasoning into the first member dispensing aperture.

* * * * *